United States Patent [19]

Brochu

[11] Patent Number: 5,007,104
[45] Date of Patent: Apr. 9, 1991

[54] SPEAKER SWITCHING DEVICE

[76] Inventor: Ernest A. Brochu, 288 Margaret Henry Rd., S. Killingly, Conn. 06106

[21] Appl. No.: 342,020

[22] Filed: Apr. 24, 1989

[51] Int. Cl.$^5$ ............................................. H04B 1/20
[52] U.S. Cl. ......................................... 455/74; 369/2; 381/123; 307/131
[58] Field of Search ................. 455/74, 133, 347, 349, 455/350; 381/59, 86, 123, 110, 81, 85; 369/2; 360/79; 361/170, 187; 307/116, 125, 131

[56] References Cited

U.S. PATENT DOCUMENTS

| | | | |
|---|---|---|---|
| 2,866,925 | 12/1958 | Wunderman | 361/160 |
| 3,201,658 | 8/1965 | Reynolds | 361/160 |
| 3,646,278 | 2/1972 | Panizzi | 369/2 |
| 3,952,154 | 4/1976 | Gates, Jr. | 381/123 |

Primary Examiner—Reinhard J. Eisenzopf
Assistant Examiner—Edward Urban
Attorney, Agent, or Firm—McCormick, Paulding & Huber

[57] ABSTRACT

A circuit electrically connecting a single pair of speakers to a radio speaker output of a radio and to a tape deck speaker output of a tape deck through relay contacts in a manner whereby in a first position of the contacts the radio speaker output is electrically connected to the speakers and the tape deck speaker output is disconnected from the speakers, and in a second position of the contacts the tape deck speaker output is electrically connected to the speakers and the radio speaker output is disconnected from the speakers. A relay energizing winding controls the positioning of the relay contacts. A current-sensitive switch is electrically connected to the relay energizing winding and to the tape deck power supply and is electrically connected to the radio power supply when the contact means is in its first position. The relay energizing winding is disconnected from the radio power supply and is energized by the tape deck power supply to move the relay contacts to their second position when a cartridge is inserted in the tape deck.

1 Claim, 1 Drawing Sheet

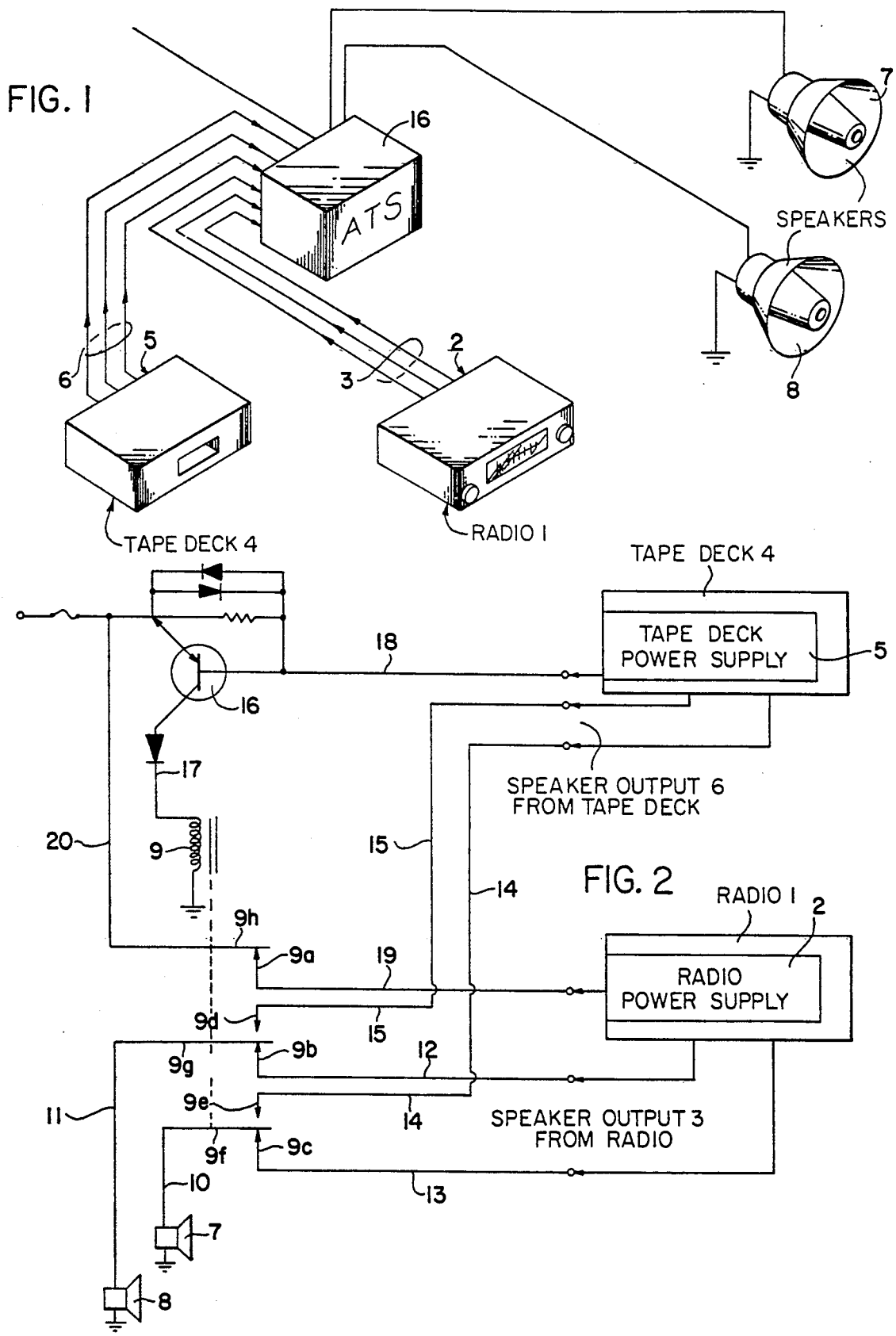

SPEAKER SWITCHING DEVICE

DESCRIPTION OF THE INVENTION

The present invention relates to a speaker switching device. More particularly, the invention relates to a speaker switching device for a radio having a radio power supply and producing a radio speaker output and a tape deck having a tape deck power supply and producing a tape deck speaker output when a tape cartridge is inserted therein.

Objects of the invention are to provide a speaker switching device of simple structure, which is inexpensive in manufacture, eliminates any duplication of speakers by permitting a single set of speakers to be used selectively for a radio and a tape deck, and functions efficiently, effectively and reliably to produce sound provided by a radio and a tape deck, selectively, with fidelity.

In order that the invention may be readily carried into effect, it will now be described with reference to the accompanying drawing, wherein:

FIG. 1 is a block diagram of an embodiment of the speaker switching device of the invention; and FIG. 2 is a circuit diagram of the embodiment of FIG. 1.

In the FIGS., the same components are identified by the same reference numerals.

The speaker switching device of the invention is for a radio 1 having a radio power supply 2 and producing a radio speaker output 3, and a tape deck 4 having a tape deck power supply 5 and producing a tape deck speaker output 6 when a tape cartridge (not shown in the FIGS.) is inserted therein.

The speaker switching device of the invention comprises a single pair of speakers 7 and 8. Relay contacts including fixed contacts 9a, 9b, 9c, 9d and 9e and movable relay armatures 9f, 9g and 9h are provided. A relay energizing winding 9 controls the positioning of the movable relay armatures 9f, 9g and 9h relative to the fixed relay contacts 9a, 9b, 9c, 9d and 9e.

Circuit conductors 10, 11, 12, 13, 14 and 15 electrically connect the speakers 7 and 8 to the radio speaker output 3 and to the tape deck speaker output 6 via the relay contacts 9b, 9c, 9d, 9e, 9f and 9g. Thus, as shown in FIG. 2, in a first position of the relay armatures 9f and 9g, as shown in FIG. 2, the radio speaker output 3 is electrically connected to the speakers 7 and 8 via the electrical conductors 13 and 10 and 12 and 11, and the tape deck speaker output 6 is disconnected from said speakers.

In a second position of the relay contacts 9f and 9g, not shown in FIG. 2, the tape deck speaker output 6 is electrically connected to the speakers 7 and 8 via the electrical conductors 14 and 10 and 15 and 11 and the radio speaker output 3 is disconnected from the speakers. This is accomplished by the movement of armatures 9f and 9g under the control of the relay energizing winding 9.

In the first position of the relay contacts, the relay armatures 9f and 9g are in their positions shown in FIG. 2 in contact with the relay contacts 9c and 9b, respectively. In the second position of the relay contacts, the relay armatures 9f and 9g are in electrical contact with the relay contacts 9e and 9d, respectively.

A current-sensitive switch or transistor 16 is electrically connected to the relay energizing winding 9 via an electrical conductor 17, and to the tape deck power supply 5 via an electrical conductor 18. The current-sensitive switch 16 is electrically connected to the radio power supply 2 via electrical conductors 19 and 20 when the relay armature 9h is in its first position, in electrical contact with the relay contact 9a, as shown in FIG. 2.

The current-sensitive switch 16 is disconnected from the radio power supply 2 and the relay energizing winding 9 is energized by the tape deck power supply 5 to move the relay armatures 9f, 9g and 9h to their second positions when a cartridge is inserted in the tape deck 4. This is due to the switch 16 changing its condition upon the increased current flow therethrough produced when a cartridge is inserted in the tape deck.

While the invention has been described by means of a specific example and in a specific embodiment, I do not wish to be limited thereto, for obvious modifications will occur to those skilled in the art without departing from the spirit and scope of the invention.

I claim:

1. A speaker switching device for a radio having a radio power supply and producing a radio speaker output and a tape deck having a tape deck power supply and producing a tape deck speaker output when a tape cartridge is inserted therein, said speaker switching device comprising a single pair of speakers;

relay contact means;

circuit means electrically connecting the speakers to the radio speaker output and to the tape deck speaker output through the relay contact means in a manner whereby in a first position of the contact means the radio speaker output is electrically connected to the speakers and the tape deck speaker output is disconnected from the speaker and in a second position of said contact means the tape deck speaker output is electrically connected to the speakers and the radio speaker output is disconnected from the speakers;

relay energizing winding means for controlling the positioning of the relay contact means; and current-sensitive transistor switch means electrically connecting the relay energizing winding means to the tape deck power supply when the tape deck power supply is activated by inserting a cartridge, said radio power supply inherently drawing a lower current than said tape deck power supply during normal operation, and said current-sensitive transistor switch means being ineffective to so energize said relay winding means unless said tape deck power supply is producing sufficient current to operate said tape deck as a result of inserting a cartridge therein.

* * * * *